United States Patent [19]

Jeschke et al.

[11] Patent Number: 5,891,927
[45] Date of Patent: Apr. 6, 1999

[54] RECYCLING OF MICROCELLULAR POLYURETHANES

[75] Inventors: Torsten Jeschke, Wehrendorf; Arne Kriesmann, Bohmte; Ute Bruns, Lingen; Wolfgang Scholz, Lemfoerde; Michael-Christian Lüderwald, Ulm; Hartmut Peuker, Bissendorf, all of Germany

[73] Assignee: BASF Aktiengesellschaft, Ludwigshafen, Germany

[21] Appl. No.: 916,181

[22] Filed: Aug. 21, 1997

[30] Foreign Application Priority Data

Aug. 22, 1996 [DE] Germany .................. 196 33 891.3

[51] Int. Cl.$^6$ .................. C08J 11/04; C08J 9/236
[52] U.S. Cl. .................. 521/49; 521/49.5; 521/54; 521/137
[58] Field of Search .................. 521/49, 49.5, 54, 521/137

[56] References Cited

U.S. PATENT DOCUMENTS

| | | | |
|---|---|---|---|
| 3,256,218 | 6/1966 | Knox | 521/54 |
| 4,692,470 | 9/1987 | Bauman et al. | 521/55 |

FOREIGN PATENT DOCUMENTS

| | | |
|---|---|---|
| 639597 | 2/1995 | European Pat. Off. . |
| 647666 | 4/1995 | European Pat. Off. . |
| 684125 | 11/1995 | European Pat. Off. . |
| 693526 | 1/1996 | European Pat. Off. . |
| 2357357 | 2/1978 | France . |
| 2035175 | 3/1972 | Germany . |
| 2731020 | 1/1978 | Germany . |
| 4316389 | 11/1994 | Germany . |
| A1 4316389 | 11/1994 | Germany . |
| A1 4409546 | 9/1995 | Germany . |

OTHER PUBLICATIONS

European Search Report Dated Jan. 20, 1998.
English Translation of EPO Search Report.
"Polyurethane Recycling–Status Report," K.W. Kroesen and D.A. Hicks, 1993, Cellular Polymers, Paper 16, pp. 1–6.
"Naphthalene–1,5–Diisocyanate as a Building Block for High Performance Polyurethane Elastomers" E.C. Prolingheuer, J.J. Lindsey, and H. Kleimann, 1989, Journal of Elastomers and Plastics, 21, 100–121.

*Primary Examiner*—Morton Foelak
*Attorney, Agent, or Firm*—Fernando A. Borrego

[57] ABSTRACT

Polyurethanes are recycled by comminution to particle sizes of from 0.01 to 2 mm and addition to the polyaddition mixture for preparing polyurethanes from (a) polyisocyanates,
(b) substances reactive toward isocyanates and having active hydrogens, and, if desired,
(c) chain extenders and/or crosslinkers, catalysts, blowing agents and customary additives in an amount of from 0.1 to 40% by weight, based on the poly-addition mixture.

17 Claims, No Drawings

RECYCLING OF MICROCELLULAR POLYURETHANES

The present invention relates to a process for the recycling of microcellular polyurethanes.

Chemical processes such as hydrolysis, hydrogenation, pyrolysis and glycolysis are suitable for the recycling of polyurethanes. Furthermore, the polyurethanes can be dissolved in isocyanates and the resulting mixture can, after purification, be reused (DE-A-43 16 389). Common to these processes is the fact that the polyurethanes can be reintroduced into their production process only at considerable expense and usually not without a loss of quality (eg. reduced isocyanate content in the component after dissolution).

Further processes for recycling comprise the preparation of compact polyurethanes from comminuted elastomers ("flake bonding") or use as filler material in the preparation of new components ("Polyurethanes Recycling—Status Report", K. W. Kroesen and D. A. Hicks, 1993, Cellular Polymers, paper 16, 1–6). Introduction of comminuted polyurethanes into the polyol component for preparing polyisocyanate polyaddition products is described in U.S. Pat. No. 4,692,470, where air introduced with the polyurethanes caused considerable problems which became apparent in an undesired increase in the viscosity. This problem was solved by wetting the comminuted polyurethanes with volatile hydrocarbons. The addition of these substances may be disadvantageous for systems in which these materials are not used as blowing agents and is to be avoided. A loss in quality of the polyurethane which is prepared using recycled polyurethanes compared with the recycled elastomers can be avoided only with difficulty in the known processes, particularly in the case of microcellular polyurethane elastomers.

It is an object of the present invention to develop a process for the recycling of polyurethanes in which these can be reintroduced into the production process for preparing polyurethanes without losses in quality having to be accepted.

We have found that this object is achieved by comminuting the polyurethanes and using them in a first reaction step together with a mixture which comprises the comminuted polyurethanes in an amount of from 0.1 to 40% by weight, based on the polyaddition mixture, (a) polyisocyanates, (b) substances reactive toward isocyanates and containing active hydrogens, and, if desired, (c) chain extenders and/or crosslinkers, catalysts, blowing agents and customary additives, to prepare a prepolymer and in a second step reacting this prepolymer with water and, if desired, (c) to give the polyurethane.

The polyurethanes comminuted by known milling methods and having a preferred particle size of from 0.01 to 2 mm, in particular from 0.1 to 2 mm, are preferably based on the components (a), (b) and, if used, (c) used in the polyaddition. According to the present invention, the proportion of comminuted polyurethanes can be from 0.1 to 40% by weight, preferably from 1 to 20% by weight, based on the weight of the polyaddition reaction mixture.

The polyurethanes used generally have a cellular structure. Preference is given to using cellular polyurethane elastomers, particularly preferably microcellular polyurethane elastomers, in particular ones which have the same structure as those which are obtainable from the starting materials (a), (b) and, if desired, (c) by a polyaddition reaction. This has the advantage that microcellular polyurethane elastomers can, owing to their outstanding damping properties together with an excellent volume compressibility, be recycled for producing vibration- and shock-damper systems (for an overview of microcellular polyurethane elastomers see, for example: "Naphthalene 1,5-Diisocyanate as a Building Block for High Performance Polyurethane Elastomers", E. C. Prolingheuer, J. J. Lindsay and H. Kleimann, 1989, Journal of Elastomers and Plastics, 21, 100–121). Particular preference is given to using microcellular polyurethane elastomers obtained as waste from the production process in which they are to be recycled.

Before use according to the present invention, the comminuted polyurethanes are dried sufficiently by known methods. Drying is usually carried out at from 80° to 150° C. and is generally complete after from 1 to 24 hours.

To prepare the polyurethane elastomers, the substances (a) and (b) and the comminuted polyurethanes, if desired together with (c), are reacted with an equivalence ratio of NCO groups to the sum of the reactive hydrogens of 0.8 to 1.2:1, preferably 0.95 to 1.1:1, by the one-shot process described in the literature, at the generally customary temperatures of from 80° to 160° C., preferably from 90° to 150° C. The comminuted elastomers can be introduced into the component (b) or/and into a prepolymer, preferably into the prepolymer, without prior wetting of the milled material with volatile substances as is necessary according to U.S. Pat. No. 4 692 470. During the usual processing time of the prepolymer or the reaction mixture of 5 hours, an increase in viscosity or a decrease in reactivity do not have an adverse effect on the production process.

Preference is given to employing the prepolymer process in which, in particular, isocyanate-containing prepolymers are used. These can be prepared by reacting a mixture comprising the comminuted polyurethane elastomers and at least one organic polyisocyanate (a), at least one compound (b) which is reactive toward isocyanates and, if desired, (c). The prepolymers preferably have isocyanate contents of from 1 to 30% by weight, particularly preferably from 3 to 15% by weight, based on the total weight. The synthesis of the prepolymer is usually carried out at from 80° to 160° C., preferably from 90° to 150° C. The reaction is generally complete after from 15 to 200 minutes. This prepolymer is subsequently reacted in a mixture comprising the component (b) and, if desired, (c) and having an equivalence ratio of NCO groups to the sum of the reactive hydrogens of 0.8 to 1.2:1, preferably 0.95 to 1.1:1, to give the desired polyurethane elastomer.

Suitable substances (a) and (b) for preparing microcellular polyurethane elastomers are the compounds known from polyurethane chemistry, about which the following may be said:

a) Polyisocyanates (a) used are aromatic, aliphatic or/and cycloaliphatic diisocyanates. Examples of aromatic diisocyanates are: naphthylene 1,5-diisocyanate (1,5-NDI), tolylene 2,4-and 2,6-diisocyanate (TDI) and also their mixtures, diphenylmethane 2,4'-, 2,2'- and preferably 4,4'-diisocyanate (MDI) and also mixtures of at least two of these isomers, 3,3'-dimethylbiphenyl diisocyanate, eg. 3,3'-dimethyl-4,4'-diisocyanatebiphenyl, 1,2-diphenylethane diisocyanate and phenylene diisocyanate, preferably phenylene 1,4-diisocyanate (PPDI). The aromatic isocyanates are used individually or as a mixture of at least two different isocyanates. Aliphatic, branched or preferably linear diisocyanates having from 4 to 12 carbon atoms, preferably from 4 to 6 carbon atoms, which may be mentioned are: dodecane 1,12-diisocyanate, 2-ethylbutane 1,4-diisocyanate, 2-methyl-pentane 1,5-diisocyanate or/and butane 1,4-diisocyanate, preferably hexamethylene 1,6-diisocyanate (HDI). Cycloaliphatic diisocyanates having from 6 to 18 carbon atoms, preferably from 6 to 12 carbon atoms, in the alkyl-substituted or non-alkyl-substituted cycloalkyl radical which can be used are, for example: cyclohexane 1,3- or/and 1,4-diisocyanate, hexahydrotolylene 2,4- or/and 2,6-diisocyanate, dicyclohexanemethane 4,4'-, 2,4'- or/and 2,2'-diisocyanate, preferably 1-isocyanato-3,3, 5-trimethyl-5-isocyanatomethylcyclohexane (IPDI).

b) Compounds (b) which are reactive toward isocyanates usually comprise polyhydroxyl compounds having a functionality of from 2 to 3, preferably 2, and a molecular weight of from 500 to 6000 g/mol, preferably from 800 to 3500 g/mol, particularly preferably from 1000 to 3300 g/mol. Examples of compounds which can be used as (b) are: polyester polyols derived from organic dicarboxylic acids and/or dicarboxylic acid derivatives and dihydric or trihydric alcohols and/or dialkylene glycols, hydroxyl-containing polycarbonates, hydroxycarboxylic acids or lactones, polyacetals such as polyoxymethylenes or water-insoluble formals such as polybutanediol formal or polyhexanediol formal, polyoxyalkylene polyols such as polyoxybutylene glycols, polyoxypropylene glycols, polyoxybutylene-polyoxypropylene glycols, polyoxybutylene-polyoxyethylene glycols and polyoxybutylene-polyoxypropylene-polyoxyethylene glycols or mixtures of at least two of the polyhydroxyl compounds mentioned. Preference is given to using difunctional polyhydroxyl compounds selected from the groups consisting of polyester polyols, hydroxyl-containing polycarbonates and polyoxybutylene glycols and also mixtures of at least two of these groups.

The polyhydroxyl compounds can be prepared by known methods.

Otherwise, the reaction can be carried out under conditions known per se and using customary additives as described, for example, in EP-A-482 476. Thus, the customary known chain extenders (eg. diamines and alkanolamines, preferably alkanediols having from 2 to 12 carbon atoms, particularly preferably having 2, 4 or 6 carbon atoms, and dialkylene glycols as well as polyoxyalkylene glycols), and/or at least trifunctional crosslinkers can be used in proportions by weight of from 5 to 50% by weight for preparing rigid polyurethane elastomers, preferably from 30 to 50% by weight, based on the component (b). Furthermore, the known blowing agents such as materials having a boiling point at atmospheric pressure in the range from –40° C. to 120° C., gases and also solid blowing agents and water, the customary catalysts such as inorganic and organic tin compounds and strongly basic amines, eg. in proportions of from 0.001 to 3% by weight, in particular from 0.01 to 1% by weight, based on the weight of the components (a) and (b), the chain extenders and crosslinkers and also the comminuted polyurethane elastomers, and customary additives can be used. The additives can comprise, for example: surface-active substances, foam stabilizers, cell regulators, fillers, flame retardants, nucleated agents, oxidation inhibitors, stabilizers, lubricants and mold release agents, dyes and pigments. Further details regarding the customary basic starting materials, auxiliaries and additives may be found in the specialist literature (see, inter alia "Kunststoff-Handbuch", Volume 7, Polyurethane, 2nd edition, 1983, edited by G. Oertel, Carl Hanser Verlag, Munich).

The microcellular polyurethane elastomers prepared by the process of the present invention have densities of from 0.35 to 0.80 g/cm$^3$ and are used for producing moldings which, owing to their very good damping properties are employed, inter alia, for spring and damping elements, eg. in vehicles and in machine construction.

The microcellular polyurethane elastomers prepared according to the present invention with comminuted microcellular polyurethane elastomers being incorporated into the reaction mixture and reacted therein have unexpectedly excellent static and dynamic properties which correspond to those of comparison products which have been prepared without the recycled elastomers.

This is demonstrated by means of the following examples:

EXAMPLES

Comparative Example I a) Preparation of a prepolymer containing isocyanate groups and based on 1,5-NDI 1000 g (0.5 mol) of a polyethanediol adipate having an average molecular weight of 2000 (calculated from the experimentally determined hydroxyl number) were heated to 140° C. and at this temperature admixed and reacted with 240 g (1.14 mol) of solid 1,5-NDI while stirring vigorously.

This gave a prepolymer having an NCO content of 4.20% by weight and a viscosity at 90° C. of 2300mPas (measured using a rotation viscometer from Haake, by means of which the viscosities in the following examples are also measured).

b) Production of cellular moldings

The crosslinker component comprised 20.7 parts by weight of 2,2', 6,6'-tetraisopropyldiphenylcarbodiimide 2.9 parts by weight of a mixture of ethoxylated oleic and ricinoleic acids having an average of 9 oxyethylene units 3.8 parts by weight of the monoethanolamine salt of n-alkylbenzenesulfonic acid having $C_9$–$C_{15}$-alkyl radicals 36.3 parts by weight of the sodium salt of sulfated castor oil 36.3 parts by weight of water and 0.03 parts by weight of a mixture of 30% by weight of pentamethyldiethylenetriamine and 70% by weight of N-methyl-N'-(dimethylaminomethyl)-piperazine.

200 g of the isocyanate prepolymer prepared as described in Comparative Example Ia and heated to 90° C. were stirred vigorously for about 8 seconds with 4.64 g of the crosslinker component. The reaction mixture was then introduced into a closable metal mold heated to 80° C., the mold was closed and the reaction mixture was allowed to cure. After 25 minutes, the microcellular molding was removed from the mold and heated for 16 hours at 110° C. for further thermal curing.

Example 1 a) Preparation of a prepolymer containing isocyanate groups and based on 1,5-NDI together with 4% of milled material 1000 g (0.5 mol) of a polyethanediol adipate having an average molecular weight of 2000 (calculated from the experimentally determined hydroxyl number) were heated to 140° C. and at this temperature admixed and reacted with 240 g (1.14 mol) of solid 1,5-NDI while stirring vigorously. After cooling to 90° C., the prepolymer was admixed while stirring with 49.6 g of a comminuted microcellular polyurethane elastomer based on 1,5-NDI and prepared as described in Comparative Example I (average particle size 500 μm, dried for 6 hours at 120° C.).

This gave a prepolymer having an NCO content of 3.95% by weight and a viscosity of 3600 mPas.

b) Production of cellular moldings

Moldings were produced by a method similar to that described in Comparative Example I from 100 parts by weight of the prepolymer described in Example Ia and 4.36 parts by weight of the crosslinker component described in Comparative Example Ib. The moldings were removed from the mold after 30 minutes and were heated for 16 hours at 110° C. for further thermal curing.

Example 2 a) Preparation of a prepolymer containing isocyanate groups and based on 1,5-NDI together with 6% of milled material 1000 g (0.5 mol) of a polyethanediol adipate having an average molecular weight of 2000 (calculated from the experimentally determined hydroxyl number) were heated to 140° C. at and this temperature admixed and reacted with 240 g (1.14 mol) of solid 1,5-NDI while stirring vigorously. After cooling to 90° C., the prepolymer was admixed while stirring with 74.4 g of a comminuted microcellular polyurethane elastomer based on 1,5-NDI and prepared as described in Comparative Example I (average particle size 500 μm, dried for 6 hours at 120° C.)

This gave a prepolymer having an NCO content of 3.89% by weight and a viscosity at 90° C. of 3700 mPas.

b) Production of cellular moldings

Moldings were produced by a method similar to that described in Comparative Example I from 200 parts by weight of the prepolymer described in Example 2a and 4.28 parts by weight of the crosslinker component described in Comparative Example Ib. The moldings were removed from the mold after 30 minutes and heated for 16 hours at 110° C. for further thermal curing.

Example 3 a) Preparation of a prepolymer containing isocyanate groups and based on 1,5-NDI together with 8% of milled material 1000 g (0.5 mol) of a polyethanediol adipate having an average molecular weight of 2000 (calculated from the experimentally determined hydroxyl number) were heated to 140° C. and at this temperature admixed and reacted with 240 g (1.14 mol) of solid 1,5-NDI while stirring vigorously. After cooling to 90° C., the prepolymer was admixed while stirring with 99.2 g of a comminuted microcellular polyurethane elastomer based on 1,5-NDI and prepared as described in Comparative Example I (average particle size 500 μm, dried for 6 hours at 120° C.).

This gave a prepolymer having an NCO content of 3.83% by weight and a viscosity at 90° C. of 3800 mPas.

b) Production of cellular moldings

Moldings were produced by a method similar to that described in Comparative Example I from 200 parts by weight of the prepolymer described in Example 3a and 4.2 parts by weight of the crosslinker component described in Comparative Example Ib. The moldings were removed from the mold after 30 minutes and heated for 16 hours at 110° C. for further thermal curing.

Example 4 a) Preparation of a prepolymer containing isocyanate groups and based on 1,5-NDI together with 4% of milled material 1000 g (0.5 mol) of a polyethanediol adipate having an average molecular weight of 2000 (calculated from the experimentally determined hydroxyl number) were heated to 130° C. and at this temperature admixed while stirring vigorously with 49.6 g of a comminuted microcellular polyurethane elastomer based on 1,5-NDI and prepared as described in Comparative Example I (average particle size 500μm, dried for 6 hours at 120° C.). The mixture was heated to 140° C. and at this temperature admixed and reacted with 240 g (1.14 mol) of solid 1,5-NDI while stirring vigorously.

This gave a prepolymer having an NCO content of 3.97% by weight and a viscosity at 90° C. of 3200 mPas.

b) Production of cellular moldings

Moldings were produced by a method similar to that described in Comparative Example I from 200 parts by weight of the prepolymer described in Example 4a and 4.32 parts by weight of the crosslinker component described in Comparative Example Ib. The moldings were removed from the mold after 30 minutes and heated for 16 hours at 110° C. for further thermal curing.

Example 5 a) Preparation of a prepolymer containing isocyanate groups and based on 1,5-NDI together with 4% of milled material 1000 g (0.5 mol) of a polyethanediol adipate having an average molecular weight of 2000 (calculated from the experimentally determined hydroxyl number) were heated to 140° C. and at this temperature admixed and reacted with 240 g (1.14 mol) of solid 1,5-NDI while stirring vigorously. At a temperature of 130° C. the prepolymer was admixed while stirring with 49.6 g of a comminuted microcellular polyurethane elastomer based on 1,5-NDI and prepared as described in Comparative Example I (average particle size 500 μm, dried for 6 hours at 120° C.).

This gave a prepolymer having an NCO content of 3.97% by weight and a viscosity at 90° C. of 3300 mpas.

b) Production of cellular moldings

Moldings were produced by a method similar to that described in Comparative Example I from 200 parts by weight of the prepolymer described in Example 5a and 4.38 parts by weight of the crosslinker component described in Comparative Example Ib. The moldings were removed from the mold after 30 minutes and heated for 16 hours at 110° C. for further thermal curing.

The cellular moldings produced as described in the Comparative Example and Examples 1 to 5 were used to measure the static and dynamic mechanical properties of the microcellular PU elastomers.

The static mechanical properties measured were the tensile strength in accordance with DIN 53 571, the elongation at break in accordance with DIN 53 571, the tear propagation resistance in accordance with DIN 53 515 and the compressive set at 80° C. by a modification of DIN 53 572 using 18 mm high spacers and test specimens having a base area of 40×40 mm and a height of 3.0±1 mm. The compressive set (CS) was calculated according to the equation $$CS = \frac{H_0 - H_2}{H_0 - H_1} \cdot 100[\%]$$

where $H_0$ is the original height of the test specimen in mm, $H_1$ is the height of the test specimen in the deformed state in mm and $H_2$ is the height of the test specimen after decompression in mm.

The dynamic mechanical properties were determined using the displacement increase (DI) at maximum force and the consolidation (CN). The molding for measuring the consolidation was a cylindrical test spring having 3 segment constrictions and a height of 100 mm, an external diameter of 50 mm and an internal diameter of 10 mm. After loading the spring over 100,000 load cycles at a force of 6 kN and a frequency of 1.2 Hz, the CN was measured as the difference between the initial and final heights of the test spring and is reported in percent. The consolidation is a measure of the permanent deformation of the cellular PU elastomers during the cyclic fatigue test. The lower this consolidation, the better the dynamic performance of the material.

The height $H_R$ for determining the consolidation after the dynamic test is determined after recording the characteristic line of the spring: $H_0$ is the initial height; the molding is precompressed 3× using the maximum force (maximum force for the characteristic lines) and the characteristic line is then recorded in the 4th cycle at a compression rate of 50 mm/min. After 10 minutes, $H_1$ is determined; this is the height of the component after recording the characteristic line. Only then is the dynamic test commenced.

$H_R$=residual height after the dynamic test measured after storage for 24 hours at 23° C./50% relative atmospheric humidity after the end of the dynamic test. The reference point (=initial height) used for determining the permanent consolidation after the dynamic test is $H_0$, the height of the spring in a completely "as new" condition, without any compression:

$$CN = \frac{H_0 - H_R}{H_0} \times 100[\%]$$

The dynamic test was carried out without additional cooling in an air conditioned room at 23° C. and 50% relative atmospheric humidity. The mechanical properties measured on the test specimens are summarized in the following table.

The static and dynamic mechanical properties of the cellular polyurethane (PU) elastomers of the present invention show no differences in comparison with the elastomers prepared in the comparative experiment. Thus, as shown in Table 1, the properties such as compressive set, tensile strength, elongation, tear propagation resistance, consolidation and displacement increase for Examples 1 to 5 correspond to those for Comparative Example I.

TABLE

Static and dynamic mechanical properties of the cellular PUR elastomers as described in Comparative Example I and Examples 1 and 5

| | Comparative Example | Example | | | | |
|---|---|---|---|---|---|---|
| | I | 1 | 2 | 3 | 4 | 5 |
| Proportion of milled material [%] | — | 4 | 6 | 8 | 4 | 4 |
| NCO content [%] | 4.2 | 3.95 | 3.89 | 3.83 | 3.97 | 3.97 |
| Viscosity at 90° C. [mPas] | 2300 | 3600 | 3700 | 3800 | 3200 | 3300 |
| Static mechanical properties | | | | | | |
| Compressive set (80° C.) [%] | 13.9 | 12 | 15.3 | 14.3 | 14.9 | 15.8 |
| Tensile strength [N/mm$^2$] | 4.4 | 4.9 | 4.6 | 3.8 | 4.6 | 5.2 |
| Elongation [%] | 370 | 370 | 340 | 280 | 360 | 380 |
| Tear propagation resistance [N/mm] | 16.6 | 17.1 | 18.1 | 16.9 | 16.4 | 18.2 |
| Dynamic mechanical properties | | | | | | |
| Consolidation [%] | 6–8 | 6.0–7.0 | 6.8–7.2 | 6.0–7.9 | 5.8–7.2 | 7.2–7.5 |
| Displacement increase [mm] | 1.4–2.1 | 2.0–2.1 | 2.0–2.6 | 1.9–2.3 | 2.1–2.2 | 2.4–2.5 |

We claim:

1. A process for the recycling of microcellular polyurethanes which comprises the steps of:
    comminuting the microcellular polyurethanes, which microcellular polyurethanes are obtainable by a polyaddition reaction of (a) polyisocyanates, (b) substances reactive toward isocyanates and containing active hydrogens, and optionally, (c) chain extenders and/or crosslinkers, catalysts, blowing agents and customary additives;
    admixing a mixture which comprises the comminuted polyurethanes in an amount of from 0.1 to 40 percent by weight, based on the polyaddition mixture, with (a) polyisocyanates, (b) substances reactive toward isocyanates and containing active hydrogens, and optionally, (c) chain extenders and/or crosslinkers, catalysts, blowing agents and customary additives, to prepare a prepolymer; and
    reacting said prepolymer with water, and optionally, additional amounts of (c) to produce a recycled polyurethane.

2. A process as claimed in claim 1, wherein the comminuted polyurethanes have a particle size of from 0.01 to 2 mm.

3. A process as claimed in claim 1, wherein the prepolymer has an NCO content of from 1 to 30% by weight.

4. A process as claimed in claim 1, wherein the polyisocyanates (a) comprise tolylene diisocyanate, diphenylmethane diisocyanate 3,3'-dimethyl-4,4'-diisocyanatobiphenyl, an aliphatic diisocyanate having from 4 to 12 carbon atoms or a cycloaliphatic diisocyanate having from 6 to 18 carbon atoms, or napthylene 1,5-diilsocyanate.

5. A process as claimed in claim 1, wherein the component (b) comprises one or more polyhydroxyl compounds having a functionality of from 2 to 3 and a molecular weight of from 500 to 6000 g/mol.

6. A process for recycling microcellular polyurethanes, comprising the steps of:
    providing microcellular polyurethane articles, which microcellular polyurethanes are obtainable by a polyaddition reaction of (a) polyisocyanates. (b) substances reactive toward isocyanates and containing active hydrogens, and optionally, (c) chain extenders and/or crosslinkers, catalysts, blowing agents and customary additives;
    comminuting said article to produce comminuted polyurethane articles;
    providing a polyaddition mixture comprising (a) polyisocyanates, (b) substances reactive toward isocyanates and containing active hydrogens, (c) optionally, chain extenders and/or crosslinkers, catalysts, blowing agents and customary additives, and (d) said comminuted polyurethane particles;

reacting said polyaddition mixture to prepare a prepolymer; and reacting said prepolymer with water and, optionally, additional amounts of components (c) to produce a recycles microcellular polyurethane.

7. A process as recited in claim 6, wherein said polyaddition mixture comprises from 0.1 to 40 percent by weight, based on the polyaddition mixture, of said comminuted polyurethane particles.

8. A process as recited in claim 6, wherein the comminuted polyurethane particles have a particle size of from 0.01 to 2mm.

9. A process as recited in claim 6, wherein the prepolymer has an NCO content of from 1 to 30 percent by weight.

10. A process as recited in claim 6, wherein the polyisocyanates (a) comprise tolylene diisocyanate, diphenylmethane diisocyanate, 3,3'-dimethyl-4,4'-diisocyanatobiphenyl, an aliphatic diisocyanate having from 4 to 12 carbon atoms and a cycloaliphatic diisocyanate having from 6 to 18 carbon atoms, or naphthylene 1,5-diisocyanante.

11. A process as recited in claim 6, wherein the component (b) comprises one or more polyhydroxyl compounds having a functionality of from 2 to 3 and a molecular weight of from 500 to 6000 g/mol.

12. A process for the recycling of microcellular polyurethanes, which comprises the steps of:

comminuting the microcellular polyurethanes, which microcellular polyurethanes are obtainable by a polyaddition reaction of (a) polyisocyanates, (b) substances reactive toward isocyanates and containing active hydrogens, and, optionally, (c) chain extenders and/or crosslinkers, catalysts, blowing agents and customary additives;

reacting (a) polyisocyanates, (b) substances reactive toward isocyanates and containing active hydrogens, and, optionally, (c) chain extenders and/or crosslinkers, catalysts, blowing agents and customary additives, in the presence of (d) the comminuted polyurethanes, to prepare a prepolymer; and reacting said prepolymer with water and, optionally, additional amounts of component (c) to produce a recycled microcellular polyurethane.

13. A process as recited in claim 12, wherein the comminuted polyurethanes comprises from 0.1 to 40 percent by weight of the polyaddition mixture.

14. A process as recited in claim 12, wherein the comminuted polyurethanes have a particle size of from 0.01 to 2 mm.

15. A process as recited in claim 12, wherein the prepolymer has an NCO content of from 1 to 30 percent by weight.

16. A process as recited in claim 12, wherein the polyisocyanates (a) comprise tolylene diisocyanate, diphenylmethane diisocyanate, 3,3'-dimethyl-4,4'-diisocyanatobiphenyl, an aliphatic diisocyanate having from 4 to 12 carbon atoms or a cycloaliphatic diisocyanate having from 6 to 18 carbon atoms, or naphthylene 1,5-diisocyanante.

17. A process as recited in claim 12, wherein the component (b) comprises one or more polyhydroxyl compounds having a functionality of from 2 to 3 and a molecular weight of from 500 to 6000 g/mol.

* * * * *